United States Patent
Dack et al.

(10) Patent No.: US 10,031,718 B2
(45) Date of Patent: Jul. 24, 2018

(54) LOCATION BASED AUDIO FILTERING

(71) Applicant: Microsoft Technology Licensing, LLC, Redmond, WA (US)

(72) Inventors: James Dack, Seattle, WA (US); Jeffrey Kohler, Redmond, WA (US); Shawn Wright, Sammamish, WA (US); Denise Ng, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/182,516

(22) Filed: Jun. 14, 2016

(65) Prior Publication Data

US 2017/0357476 A1    Dec. 14, 2017

(51) Int. Cl.
*H04B 3/00* (2006.01)
*G06F 3/16* (2006.01)
(Continued)

(52) U.S. Cl.
CPC ............ *G06F 3/165* (2013.01); *H04M 1/725* (2013.01); *H04R 3/005* (2013.01); *H04W 8/20* (2013.01); *H04W 64/003* (2013.01)

(58) Field of Classification Search
CPC .......... G06F 3/165; H04R 3/005; H04W 8/20; H04W 64/003
(Continued)

(56) References Cited

U.S. PATENT DOCUMENTS 5,778,083 A     7/1998   Godfrey
7,492,915 B2    2/2009   Jahnke
(Continued)

FOREIGN PATENT DOCUMENTS

WO    2011068192 A1    6/2011
WO    2014178479 A1    11/2014
(Continued)

OTHER PUBLICATIONS

Tsingos, Nicolas, "Pre-Computing Geometry-based Reverberation Effects for Games", In Proceedings of 35th AES Conference on Audio for Games, Feb. 11, 2009, pp. 1-10.
(Continued)

*Primary Examiner* — Vivian Chin
*Assistant Examiner* — Friedrich W Fahnert
(74) *Attorney, Agent, or Firm* — Alleman Hall Creasman & Tuttle LLP

(57) ABSTRACT

Methods and systems for augmenting an audio signal are provided for herein. In some embodiments, a method can be performed by a sound processing system of a computing device. In such embodiments, the sound processing system can receive a captured audio signal from a microphone coupled with the sound processing system. The sound processing system can then produce an augmented audio signal by selectively filtering the captured audio signal based on a physical location of the computing device. This resulting augmented audio signal can reflect an effect associated with the physical location of the computing device. The augmented audio signal can then be output, by the sound processing system, to a speaker coupled with the computing device to enable consumption of the augmented audio signal by a user of the computing device. Other embodiments may be described and/or claimed herein.

20 Claims, 8 Drawing Sheets

(51) Int. Cl.
*H04W 64/00* (2009.01)
*H04R 3/00* (2006.01)
*H04W 8/20* (2009.01)
*H04M 1/725* (2006.01)

(58) Field of Classification Search
USPC .................................................. 381/77–81
See application file for complete search history.

(56) References Cited

U.S. PATENT DOCUMENTS

| | | |
|---|---|---|
| 7,563,168 B2 | 7/2009 | Jahnke |
| 8,249,264 B2 | 8/2012 | Bailey et al. |
| 8,831,255 B2 | 9/2014 | Crawford et al. |
| 2012/0057734 A1 | 3/2012 | Ambrose et al. |
| 2013/0293723 A1 | 11/2013 | Benson et al. |
| 2014/0161268 A1 | 6/2014 | Antani et al. |
| 2014/0350944 A1 | 11/2014 | Jot et al. |
| 2015/0312677 A1* | 10/2015 | Kraft .................. H04R 1/1083 381/72 |
| 2015/0355880 A1* | 12/2015 | Kraft .................. G06F 3/165 700/94 |
| 2015/0373474 A1* | 12/2015 | Kraft .................. H04R 1/1083 381/17 |
| 2015/0382106 A1* | 12/2015 | Kraft .................. H04R 1/1083 381/119 |
| 2016/0026253 A1* | 1/2016 | Bradski .............. G02B 27/225 345/8 |
| 2017/0061692 A1* | 3/2017 | Giraldi ............... G06T 19/006 |
| 2017/0099538 A1* | 4/2017 | Kraft .................. H04R 1/1083 |

FOREIGN PATENT DOCUMENTS

| | | |
|---|---|---|
| WO | 2014199155 A1 | 12/2014 |
| WO | 2015088984 A1 | 6/2015 |

OTHER PUBLICATIONS

"Standard Effects", Published on: Dec. 6, 2014, Available at: https://msdn.microsoft.com/en-us/library/windows/desktop/bb318669(v=vs.85).aspx#dx_Standard_Effects_Environmental_Reverberation.

\* cited by examiner

LOCATION BASED AUDIO FILTERING

BACKGROUND

The use of augmented reality (AR) continues to grow as systems that are capable of providing an augmented reality experience become more prevalent. AR typically involves augmenting, or enhancing, a real-world environment with computer-generated objects. This can be accomplished, for instance, by capturing information (e.g., a wire mesh or video feed) of the real-world environment and utilizing this information to add computer-generated imagery to the real-world environment. The computer-generated imagery can then be displayed to a user of the augmented reality system either in conjunction with a live video feed of the real-world environment or overlaid over the real-world environment via a transparent display component. The computer-generated imagery is often accompanied by sounds that complement the computer-generated imagery. The accompanying sounds can influence the acoustic experience of the user, in particular within an AR experience. However, sounds from the real-world environment do not comport with the computer-generated imagery. Because the sounds from the real-world environment do not comport with what is being perceived by the user in the AR experience, the sounds from the real-world environment can seem out of place and distract the user from the AR experience.

SUMMARY

Embodiments described herein include methods, computer-storage media, and systems for selectively filtering audio from a real-world environment based on an identified location within the real-world environment. In filtering the real-world audio based on the identified location, the real-world audio can be modified to reflect an augmented reality (AR) experience presented to a user at the identified location. Because of this, the user can be more fully immersed in the AR experience. Such selective filtering can be accomplished by initially capturing the real-world audio through the use of, for example, one or more microphones located within the real-world environment. The real-world audio captured by the one or more microphones can then be passed as an audio signal to a sound processing system of a mobile computing device. The sound processing system can then identify a physical location of the mobile computing device within the real-world environment based on various location sensors. Based on this identified location, the sound processing system can select a filter associated with the identified location. Such a filter can be designed to impart an effect on the audio signal that comports with the AR experience being presented to the user. For example, the filter can be designed to add reverberation, an echo, etc. to the audio signal. The sound processing system can then utilize the selected filter in conjunction with the audio signal to produce an augmented audio signal that reflects the AR experience. This augmented audio signal can then be output (e.g., to one or more speakers) for consumption by the user.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present disclosure is described in detail below with reference to the attached drawing figures.

DETAILED DESCRIPTION

Various embodiments disclosed herein enable filtering of audio from a real-world environment based on an identified location within the real-world environment. In filtering the real-world audio based on the identified location, the real-world audio can be modified to reflect the presence of computer-generated images that have been integrated with the real-world environment as part of an augmented-reality (AR) experience presented to a user at the identified location. As such, the user can not only perceive the computer-generated images, but the user also perceives an effect that objects within the computer-generated images would have on the real world audio. For example, suppose the user is traversing through an AR experience and the user is presented with a computer-generated canyon at a certain physical location. By filtering the real-world audio based on the physical location, the user can perceive not only the canyon, but also the effect the canyon would have on, for example, the user's voice (e.g., the user's voice could be filtered to cause the voice to echo, reverberate, etc.). Because of this filtering of the real-world audio, the user can be more fully immersed in the AR experience. Additional benefits of the disclosed embodiments are discussed throughout disclosure.

Figure 1:
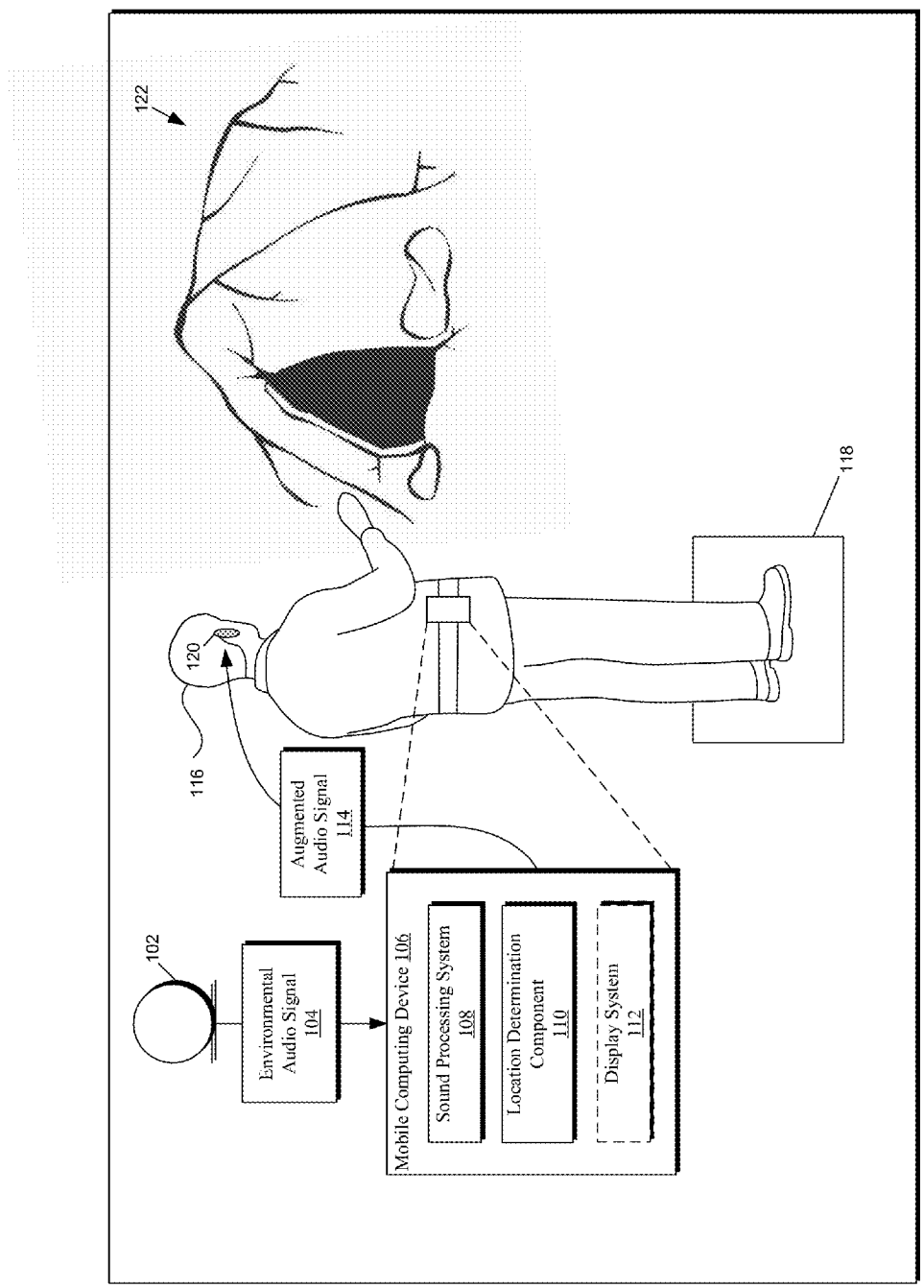
FIG. 1 is a diagram of an illustrative augmented reality (AR) environment in which various embodiments of the present disclosure can be employed.

FIG. 1 is a diagram of an illustrative augmented reality (AR) environment 100 in which various embodiments of the present disclosure can be employed. As depicted, AR environment 100 includes a mobile computing device 106. Mobile computing device 106 can be configured to augment environmental sounds to reflect an effect of a current physical location of the mobile computing device 106. As used herein, environmental sounds include those sounds a user would perceive in the absence of the AR experience (e.g., ambient sound, sound generated by user 116, etc.). As such, the mobile computing device 100 can enable a user to be immersed in an AR experience where environmental sounds perceived by user 116 comport with the AR experience in which user 116 is immersed.

In embodiments, environmental sounds can initially be captured as sound waves by microphone 102. From these sound waves, microphone 102 can generate environmental audio signal 104. In embodiments, microphone 102 can be communicatively coupled with mobile computing device 106 to enable the input of environmental audio signal 104 to mobile computing device 106. Such communicative coupling can take the form of any wired communication mechanism (e.g., bus, phono cable, etc.), wireless communication mechanism (e.g., Bluetooth®, Wi-Fi, etc.), or any combination thereof. While depicted as being omnidirectional, it will be appreciated that microphone 102 could alternatively take the form of a directional microphone, or other suitable configuration. In addition, while only a single microphone is depicted, this is merely for the sake of simplicity. It will be appreciated that additional microphones, or microphone arrays, can be included to capture various environmental sounds, without departing from the scope of this disclosure. An embodiment including additional microphones is discussed in greater detail in reference to FIG. 3, below. In addition, while microphone 102 is depicted as being separate from mobile computing device 106, in other embodiments microphone 102 could be integrated into mobile computing device 106. In embodiments where microphone 102 is integrated into mobile computing device 106, microphone 102 can be communicatively coupled with sound processing system 108, which can take environmental audio signal 104 as input.

To fully immerse user 116 in an AR experience in accordance with a current physical location of mobile computing device 106, mobile computing device 106 includes a location determination component 110. Location determination component 110 is configured to identify a current physical location (e.g., physical location 118) of mobile computing device 106, and thereby the physical location of user 116. To accomplish this, location determination component 110 can include, or be coupled with, one or more location sensors. Such location sensors can include any sensors from which a current physical location of computing device 106 can be logically determined, such as, for example, global positioning satellite (GPS) sensors. It will be appreciated that GPS sensors are merely meant to be illustrative of one mechanism by which the current physical location of mobile computing device 106 can be determined. The manner in which the physical location of mobile computing device 106 is determined should not be viewed as limiting of this disclosure. Any number of other sensors can be utilized to determine a location of mobile computing device 106 without departing from the scope of this disclosure. Additional examples of such location sensors are discussed in reference to FIG. 2, below.

In the depicted example, physical location 118 corresponds with an AR experience in which user 116 is presented with a virtual cave 122. In some embodiments, virtual cave 122 could be presented to user 110 via an optional display system 112 of computing device 102. In such embodiments, mobile computing device could take the form of a head mounted display, such as that discussed in reference to FIGS. 7 and 8, below; a mobile phone in conjunction with a head mounted display (e.g., Samsung Gear VR), a mobile phone on its own, or any other mobile computing device with display capabilities. In other embodiments, virtual cave 122 could be projected in front of the user (e.g., directly on a wall or fixed screen), or otherwise presented to the user in a manner independent of mobile computing device 102.

Mobile computing device 106 further includes sound processing system 108. Sound processing system 108 is configured to selectively filter environmental audio signal 104 based on the physical location determined by location determination component 110 (e.g., physical location 118). This selective filtering enables the user to perceive the environmental audio in a manner consistent with the AR experience presented to the user at physical location 118. For example, in the depicted AR experience, user 116 is presented with the virtual cave 122 at physical location 118. In such an example, the selective filtering could be configured to select a filter that would add reverb or echo to the environmental audio signal (e.g., the user's voice) to augment the environmental audio signal to reflect the presence of the virtual cave 122. Without the selective filtering, user 116 would merely be able to hear the environmental audio, which could distract the user from the AR experience because it would not comport with what the virtual imagery presented to the user in the AR experience.

To selectively filter environmental audio signal 104, sound processing system 108 can be configured to select a filter that is associated with the physical location determined by location determination component 110. In embodiments, this filter can be selected from a group of filters that are each associated with at least one physical location at which the respective filter is to be applied. The respective physical location associated with a filter can be referred to herein as a filter location in an effort to distinguish this location from the physical location at which the mobile computing device 106 is located. Likewise, the physical location at which the mobile computing device 106 is located can be referred to herein as a device location. A filter location can be defined as a single distinct location (e.g., single set of GPS coordinates) for application of a respectively associated filter, as a physical area (e.g., multiple sets of GPS coordinates defining a boundary) for application of a respectively associated filter, or in any other suitable manner for defining a location that is utilized in applying the respectively associated filter. Additional aspects of filter locations are discussed in reference to FIGS. 2 and 4, below.

The association between each filter and the respective filter locations can be defined through any suitable mechanism. For example, the association can be defined by a table that correlates each filter with one or more respective filter locations, through a map (e.g., map 400 of FIG. 4) that correlates each filter with one or more respective filter locations, or through any other suitable mechanism for storing a correlation between filter locations and respective filters.

In some instances a filter can be selected for application to environmental audio signal 114 by identifying a filter location that corresponds to, or encompasses, physical location 118. In other instances a filter can be selected for application to environmental audio signal 114 by identifying a filter location that is within a defined proximity of physical location 118 to the filter location. It will be appreciated that these methods of selecting a filter are merely meant to be illustrative in nature and that any mechanism for selecting a filter based on a determined physical location of a mobile device is expressly contemplated as being within the scope of this disclosure.

Once a filter has been selected, sound processing system 108 can apply the selected filter to environmental audio signal 104 to cause environmental audio signal 104 to reflect an effect associated with physical location 118. By applying the filter to environmental audio signal 104 an augmented audio signal 114 is produced. The augmented audio signal 114 can then be output to user 116 of computing device 106, by way of headphones 120 for consumption of augmented audio signal 114 by user 116.

It will be appreciated that, although only three components are depicted in mobile computing device 102, this is merely for simplicity of explanation. Mobile computing device 106 can contain, or include, any number of additional components that are discussed herein or would be readily recognized within the art. In addition, the depicted components can be further broken up into more components or can be combined into fewer components without departing from the scope of this disclosure.

Figure 2:
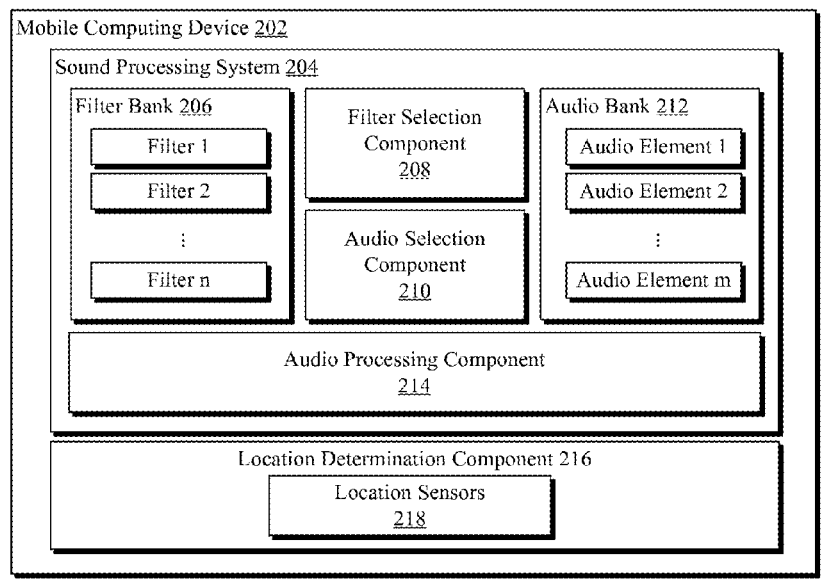
FIG. 2 is a block diagram depicting a more detailed representation of an illustrative mobile computing device, in accordance with various embodiments of the present disclosure.
Figure 7:
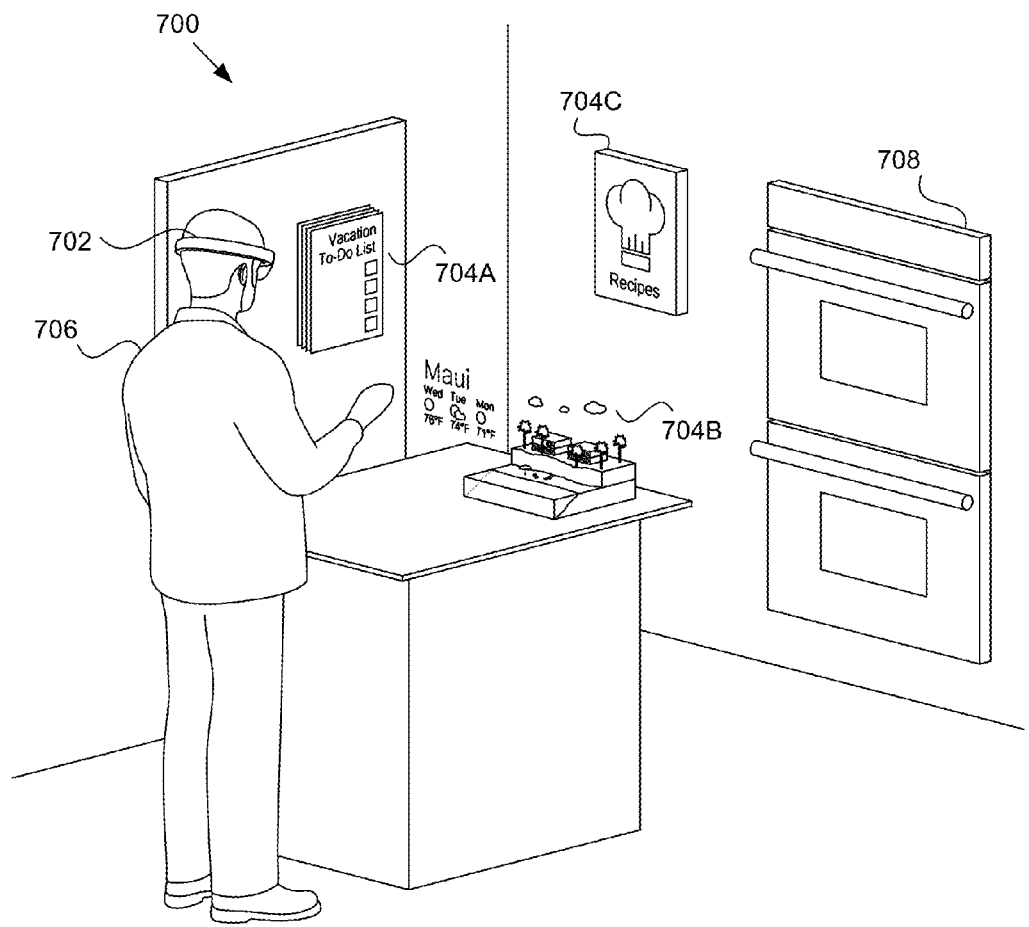
FIG. 7 is an illustration showing exemplary augmented-reality images of a head-mounted display unit, in accordance with embodiments of the present invention.

FIG. 2 is a block diagram depicting a more detailed representation of an illustrative mobile computing device 202 (e.g., mobile computing device 106 of FIG. 1 or HMD 702 of FIG. 7. Mobile computing device 202 includes sound processing system 204 and location determination component 216. Sound processing system 204 can configure mobile computing device 202 to selectively filter an environmental audio signal based on a physical location of computing device 202, as discussed in reference to FIG. 1. Such selective filtering can enable a user of mobile computing device 202 to perceive the environmental audio in a manner consistent with an AR experience presented to the user at the same location.

To accomplish the selective filtering based on a physical location of mobile computing device 202, mobile computing device 202 may need to determine a current physical location. As such, mobile computing device 202 includes a location determination component 216. Location determination component 216 can be configured to determine the current physical location of mobile computing device 202. To accomplish this, location determination component 106 can utilize location sensors 212. Location sensors 212 can include, but are not limited to, global positioning satellite sensors (GPS), an altimeter, infrared sensors, radio frequency sensors, one or more image capture sensors (e.g., one or more cameras), Wi-Fi sensors, or any other suitable sensors capable of determining a physical location of mobile computing device 202.

In some instance, the location determination component 216 can be configured to utilize location sensors 218 to determine an absolute physical location of mobile computing device. Such an absolute physical location could be represented, for example, by GPS coordinates, Universal Transverse Mercator (UTM) coordinates, Universal Polar Stereographic (UPS) coordinates etc. In other instances, location sensors 218 can be utilized to determine a relative location of the mobile computing device 202. Such a relative location can be determined, for example, utilizing measurements (e.g., from infrared sensors, or images captured by one or more cameras) from walls or other objects to determine a location of the mobile computing device relative to the walls or other objects. From these measurements a relative physical location of mobile computing device 202 can be determined. Such a relative physical location can identify a location of mobile computing device, for example, within a room, building, or other structure. In still other instances, both an absolute location and a relative location can be utilized to determine a physical location of mobile computing device. For example, an absolute location can be utilized to determine that the mobile computing device is located within a certain building, while a relative location can be utilized to determine where the mobile computing device is located within the building. In addition, a physical location of mobile computing device 202 could be identified based on an object (e.g., a QR code) placed within the physical location that is then scanned (e.g., utilizing a camera coupled with mobile computing device 202). The information acquired from such a scan of the object can be utilized to identify the current physical location of mobile computing device 202.

In various embodiments, one or more of the location sensors 218 can be utilized to determine a three-dimensional physical location (relative, absolute, or a combination thereof) of mobile computing device 202. For instance, GPS sensors can be utilized to determine both longitude and latitude coordinates in conjunction with an altimeter to determine an altitude measurement for the mobile computing device 202.

Once a physical location of mobile computing device 202 is determined, one or more filters can be selected to be applied to environmental audio signals (e.g., environmental audio signal 114 of FIG. 1 or environmental audio signals 302 of FIG. 3) received by mobile computing device. In addition one or more additional sounds can be selected which can be incorporated with the environmental audio signals to further immerse a user of mobile computing device 202 into an AR experience. To accomplish this, sound processing system 204 includes a filter bank 206, a filter selection component 208, an audio selection component 210, an audio bank 212, and an audio processing component 214. Each of these components is discussed in turn.

Filter bank 206 includes a number of filters ranging from filter 1 to filter n, where n can be any positive number. Filters 1-$n$ can include filters implemented via software, hardware, firmware, or any combination of such filters. Each of filters 1-$n$ can be designed to be applied to an audio signal (e.g., environmental audio signal 104 of FIG. 1) to augment the audio signal with a desired effect. Such effects can include, for instance, a desired reverberation, echo, or any other audio effect. For example, suppose the user is being immersed in an AR experience in which the user is traversing virtual steel grates at a predetermined physical location. In such an example, an audio signal that includes the user's voice could be augmented to reflect the reverberation caused by the virtual steel grates. As such, not only does the user perceive the virtual steel grates during the AR experience, but the user also perceives the effect that the steel grates would have on the environmental audio, even though the steel grates are virtual.

Filter selection component 204 can be configured to select at least one of filters 1-$n$ from filter bank 206 based, at least in part, upon the physical location of mobile computing device 202 determined by location determination component 216. To accomplish this, filter selection component 208 can be configured to correlate filters 1-$n$ with at least one physical location in which each of the filters are to be implemented. This correlation of filters with physical locations can be accomplished, in at least some embodiments, in accordance with a predefined map (e.g., map 400 of FIG. 4) that correlates filters with specific physical locations at which the respectively correlated filter is to be utilized. Such a predefined map can take the form of a listing of coordinates that identify the physical location, or boundaries of the physical location. In various embodiments, filter selection component 204 can be communicatively coupled with location determination component 216. In such embodiments, filter selection component 204 can request a current physical location of mobile computing device 102 from location determination component 216. Based on this current physical location, filter selection component 204 can select at least one of the filters from filter bank 202 to be applied to an environmental audio signal being processed by sound processing system 104.

Audio bank 212 includes a number of audio elements ranging from audio element 1 to audio element m, where m can be any positive number. Audio elements 1-$m$ can include pre-recorded audio files that can be utilized to further augment an AR experience by enabling the incorporation of additional sounds captured within each audio element into the AR experience. For instance, returning to the example in which the user is traversing virtual steel grates, in such an example, an audio element can be utilized that reflects metallic sounds produced by the steel grates. As such, not only does the user perceive the virtual steel grates during the AR experience and the effect that the steel grates would have on the environmental audio, the user can also perceive sounds that would be produced by the steel grates if they were not virtual.

Audio selection component 210 can be configured to select at least one of audio elements 1-$m$ from audio bank 212 based on any number of criteria. Such criteria can include, for example, a physical location determined by location determination component 216, an action performed by the user (e.g., a step taken by a user on a steel grate), synchronization with a visual element of the AR experience, or any other suitable criteria. To accomplish this, audio selection component 210 can be configured to correlate each of audio elements 1-$m$ with at least one criteria in response to which the respectively correlated audio element is to be selected. This correlation of audio elements with criteria can be accomplished, in at least some embodiments, utilizing a table that correlates each audio element with one or more criteria, through a map (e.g., map 400 of FIG. 4) that correlates audio elements with one or more respective physical locations, or through any other suitable mechanism for storing a correlation between audio elements and respective criteria. As an example, in various embodiments, audio selection component 210 can be communicatively coupled with location determination component 216. In such embodiments, audio selection component 210 can request a current physical location of mobile computing device 202 from location determination component 216. Based on this current physical location, audio selection component 210 can select at least one of the audio elements from audio bank 212 to be integrated with the above discussed environmental audio signal being processed by sound processing system 204.

Audio processing component 210 can be configured to take as input one or more filters determined by filter selection component 208 and an environmental audio signal (e.g., environmental audio signal 104) and utilize these to produce an augmented audio signal (e.g., augmented audio signal 114 of FIG. 1). To accomplish this, audio processing system can initially apply the one or more filters to the environmental audio signal to produce a filtered audio signal that reflects an effect associated with physical location identified utilizing location determination component. This filtered audio signal can then be incorporated into the augmented audio signal. It will be appreciated that, in embodiments where the filtered audio signal is the only audio signal being incorporated into the augmented audio signal that the filtered audio signal effectively becomes the augmented audio signal.

In some instances, audio processing component 210 can be configured to apply the filter in a gradient manner based on a measure of proximity between the device location and the filter location, or based on the device location within the filter location. For instance, in the example depicted in FIG. 1, where the user is immersed in an AR experience including a cave, as the user moves closer to the mouth of the cave the application of the filter to the environmental audio signal can be increased. In contrast, as the user move farther away from the mouth of the cave, the application of the filter can be decreased. Whether the selected filter is to be applied in a gradient manner can be defined, for example, via a setting in the data structure that correlates the filter with the filter location.

In addition, in various instances, audio processing component can be configured to apply the filter based on a head orientation of the user. For instance, returning to the previous example concerning the cave, if the user is facing towards the mouth of the cave, the reverb from the cave would be relatively greater than if the user is facing away from the cave, where the reverb from the cave would be relatively reduced or non-existent. As an example, a location within the filter area can be identified (e.g., by coordinates or other suitable identifier) as a focal point and the selected filter can be applied based on the user's head orientation to the focal point. Any conventional mechanism for determining the user's head orientation can be utilized.

Figure 3:
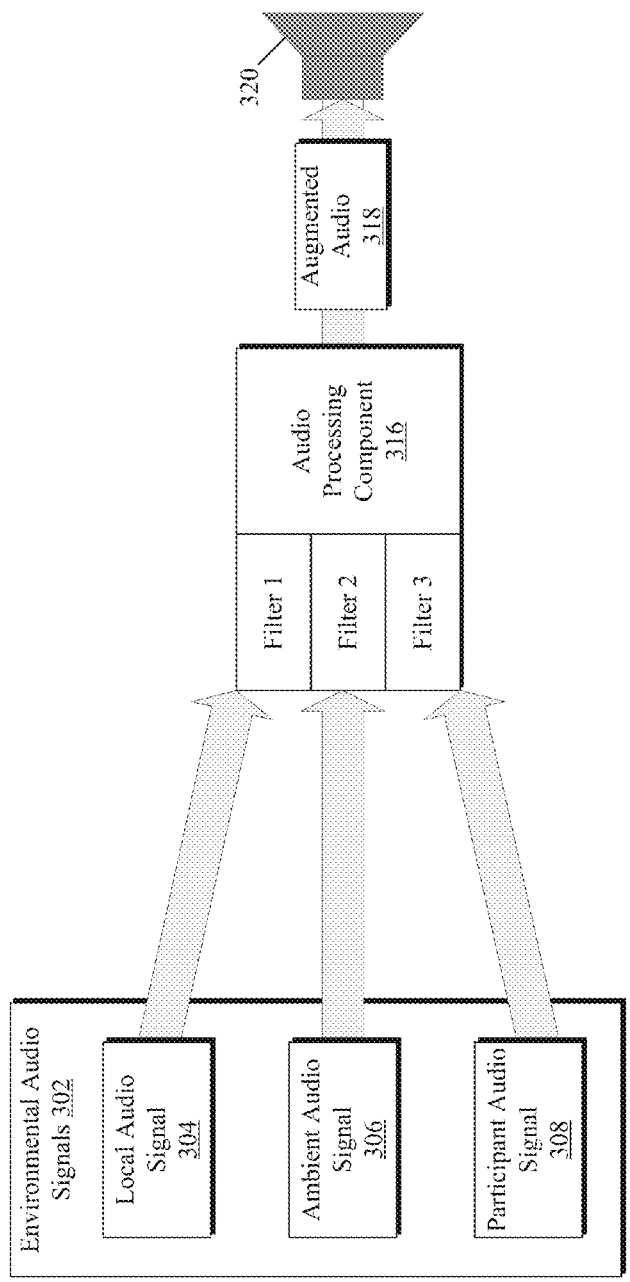
FIG. 3 depicts an illustrative embodiment in which multiple environmental audio signals are received and processed, in accordance with various embodiments of the present disclosure.

In some instances, the environmental audio signal can include multiple audio signals captured by various microphones (e.g., as depicted in FIG. 3). In such an instance, each of the multiple audio signals can be associated with one or more sources captured within the respective audio signal (e.g., due to microphone placement). For instance, consider an AR experience in which the user is adorned with a virtual helmet at a specified physical location. A first audio signal that includes local sounds made within the helmet (e.g., user's voice, breath sounds, etc.) may be filtered utilizing a first filter, while a second audio signal that includes ambient sounds outside the helmet may be filtered utilizing a second filter. In such instances, filter selection component 210 can be configured to select the two filters based on the specified location, and audio processing component 214 can, in turn, be configured to apply the first filter to the first audio signal and the second filter to the second audio signal. Such an embodiment is discussed in greater detail in reference to FIG. 3.

In instances where audio selection component 210 has selected an audio element from audio bank that is to be incorporated into an augmented audio signal, audio processing component 214 can be configured to incorporate, or mix, the selected audio element into the augmented audio signal. In such embodiments, the selected audio element can be incorporated into the augmented audio signal utilizing any conventional audio mixing mechanisms. In some embodiments, the audio element can be incorporated prior to application of a filter to the environmental audio signal. In such embodiments, the audio element would be filtered utilizing the same filter as that utilized for the environmental audio signal, thus resulting in the audio element reflecting the same effect. In other embodiments, the audio element can be incorporated after application of the filter to the environmental audio signal such that the audio element is not filtered.

In some instances, the user may be in an AR experience with one or more other users, referred to as participants, that each has a mobile computing device similarly configured to mobile computing device 202. In such instances, audio (e.g., a participant's voice) captured by any of the mobile computing devices, herein referred to as participant audio, could be transmitted to mobile computing device 202. The participant audio could be received having already been filtered for an effect associated with a location of the participant's device location. In other instances, the participant audio could be received in conjunction with a participant device location that identifies the physical location of the participant's device and the above described process could be utilized in conjunction with the participant location to select and filter the participant audio. Such an embodiment is described in more detail in reference to FIG. 3.

FIG. 3 depicts an illustrative embodiment in which multiple environmental audio signals 302 are received. As depicted, environmental audio signals 302 include a local audio signal 304, an ambient audio signal 306, and a participant audio signal 308. As used herein, local sounds can include, for example, those sounds produced by a nose and/or mouth of a user, such as, for example, the voice or breath sounds of the user. Local audio signal 304 can be produced by one or more microphones positioned near the face of the user to capture these local sounds. In addition, as used herein, ambient sounds can include, for example, background sound that is produced within the vicinity of the user, such as, for example, footsteps of the user, or footsteps of another person within the vicinity of the user. Ambient audio signal 306 can be produced by one or more microphones positioned (e.g., outwardly directed from the user) to capture these ambient sounds.

In the depicted embodiment, separate filters (e.g., filter 1 and filter 2) can be selected for the local audio signal 304 and the ambient audio signal 306 based on the device location, as discussed above, and based further on the source associated with each of these audio signals. For example, consider an AR experience in which the user is wearing a virtual helmet (e.g., the AR experience involves motorcycles) at certain physical locations. In such an AR experience, when the user is at a location at which the user is wearing the virtual helmet, filter 1 is applied to the local audio signal 304 to cause the local audio signal 304 to sound as if the user is, for example, speaking with a real helmet on. In addition, filter 2 can be applied to the ambient audio signal 306 to cause, for example, the user's footsteps, to sound as if the user is wearing a real helmet (e.g., the footsteps would sound more muffled). It will be appreciated that, in physical locations in which the user is not wearing a helmet, a different filter can be selected that could be applied to both the local audio signal 304 as well as the ambient audio signal 306. Once filtered, these audio signals can be incorporated into the augmented audio 318 by audio processing component 316 and output to speaker 320 for consumption by the user.

In some instances, the user may be immersed in an AR experience with one or more other users, referred to herein as participants. These participants can each utilize a computing device, referred to herein as a participant computing device, that is configured in a similar manner to the user's computing device (e.g., mobile computing device 106 of FIG. 1 or 202 of FIG. 2). In such instances, audio (e.g., a participant's voice) captured by any of the participant computing devices, could be transmitted to the user's computing device as a participant audio signal 308. For instance, consider two users, a first user and a second user, immersed in an AR experience in which the users are astronauts and both users are at a physical location in which the users are on a space walk with virtual helmets. The users may be able to communicate with one another utilizing a virtual radio that mimics those sounds produced by a radio of an actual space suit. To accomplish this, the first user's local audio signal can be passed as a participant audio signal to a computing device of the second user. In some embodiments, the participant audio signal can be selectively filtered, as described herein, by the first user's computing device, based upon a physical location of the first user's computing device (i.e., a participant location). In such embodiments, the participant audio signal 308 could be integrated into augmented audio 318 by audio processing component 316 without any filtering being performed by the second user's computing device. In other embodiments, the participant audio signal 308 along with a participant location can be received by the second user's computing device. In response, the second user's computing device can utilize the participant location to selectively filter the participant audio signal 308, as described herein, based on the participant location. The resulting filtered participant audio signal can then be integrated into augmented audio 318 and output to speaker 320 for consumption by the user.

Figure 4:
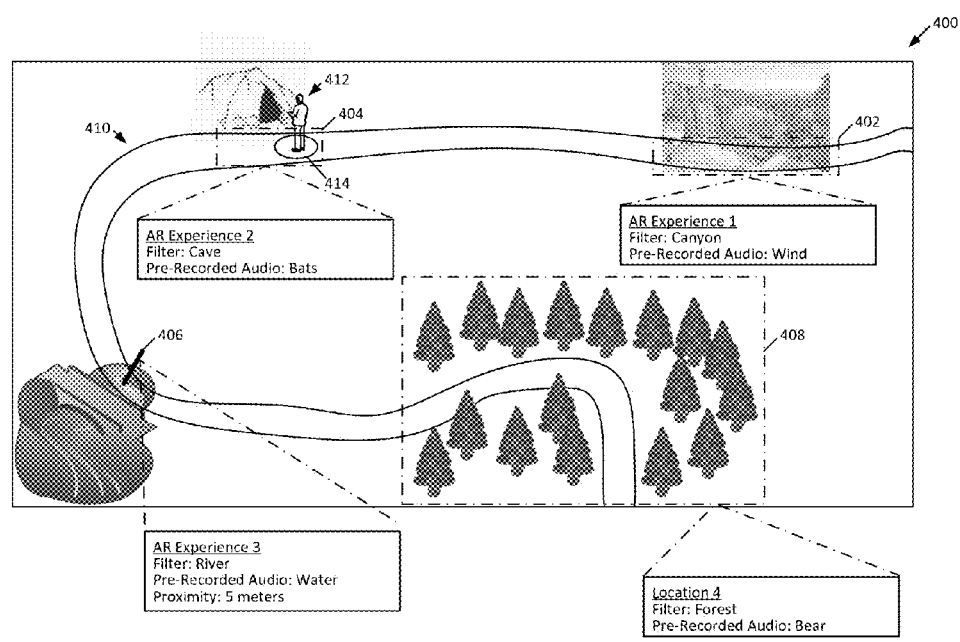
FIG. 4 depicts an illustrative map, including filter locations and a user with respect to a path that traverses physical space, in accordance with various embodiments of the present disclosure.
Figure 5:
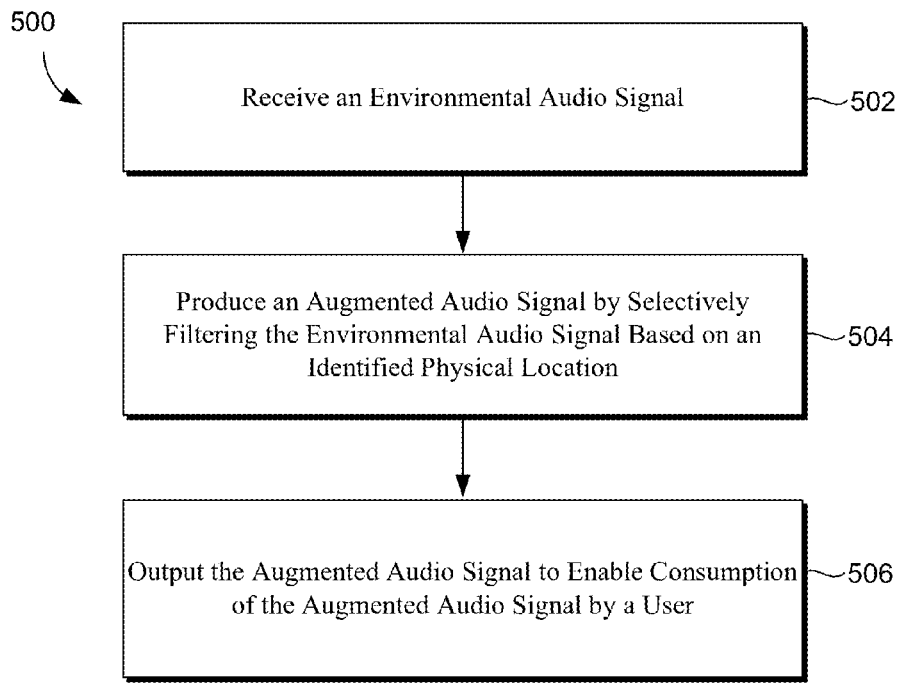
FIG. 5 is a flow diagram depicting an illustrative method for processing an audio signal, in accordance with various embodiments of the present disclosure.

FIG. 4 depicts an illustrative map 400, including filter locations and a user with respect to a path 410 that traverses physical space. As depicted, map 400 includes four different AR experiences 1-4. Each of these AR experiences includes a defined filter location, filter locations 402-408, for the respective AR experience. As can be seen, each of the filter locations includes an identified filter that is to be applied when a user is within the associated filter location. Each of filter locations 402, 404, and 408 can be defined by coordinates identifying corners of the filter locations. Filter location 406, on the other hand, defines a single coordinate position and a proximity (e.g., 5 meters) that together define filter location 406 having a radius of 5 meters around the single coordinate position. In addition, map 400 also depicts a location 414 of a depicted user 412. As can be seen, the location 414 of user 412 is within filter location 404. As such, the 'cave' filter would be utilized in processing environmental audio in the vicinity of user FIG. 5 is a flow diagram depicting an illustrative method 500 for processing an audio signal, in accordance with various embodiments of the present disclosure. Method 500 may be carried out, for example, by a sound processing system (e.g., sound processing system 108 of FIG. 1 or 204 of FIG. 2). Method 500 begins at block 502 where an environmental audio signal is received. Such an environmental audio signal could be produced, for example, by one or more microphones located within a real-world environment, as discussed herein. At block 504 the environmental audio signal is selectively filtered based on an identified physical location to produce an augmented audio signal. In selectively filtering the environmental audio signal, the environmental audio signal can be modified to reflect an effect associated with the identified physical location. This selective filtering can be accomplished as described elsewhere herein. At block 506, the augmented audio signal is output to enable consumption (i.e., listening) of the augmented audio signal by the user.

Figure 6:
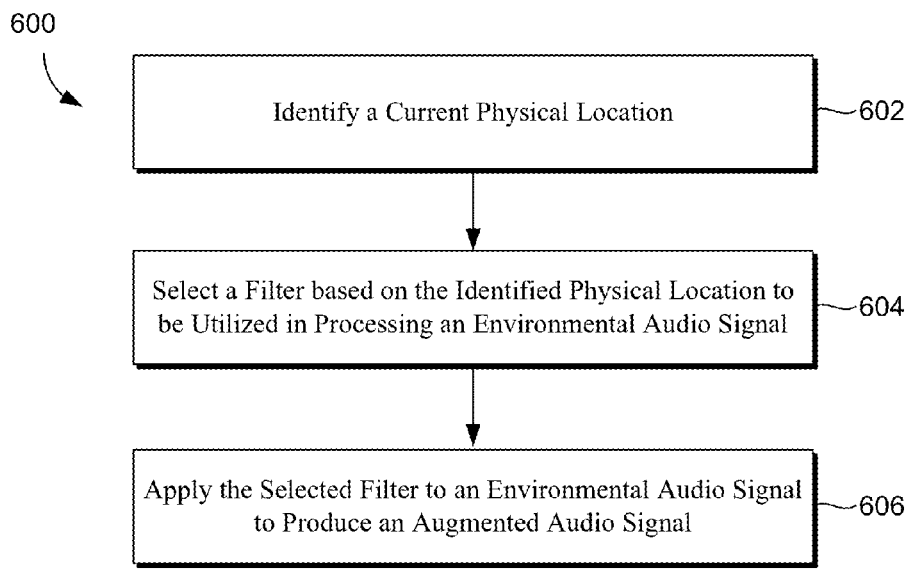
FIG. 6 is a flow diagram depicting an illustrative method for selectively filtering an audio signal based on an identified physical location, in accordance with various embodiments of the present disclosure.

FIG. 6 is a flow diagram depicting an illustrative method 500 for selectively filtering an audio signal, in accordance with various embodiments of the present disclosure. Method 600 may be carried out, for example, by a sound processing system (e.g., sound processing system 108 of FIG. 1 or 204 of FIG. 2). In addition method 600 can be carried out as part of block 504 of FIG. 5. Method 600 begins at block 602 where a current physical location is identified. Such a current physical location can be identified utilizing, for example, the location determination component discussed in reference to FIGS. 1 and 2, above. At block 604 a filter is selected based on the identified physical location to be utilized in processing an environmental audio signal. Such a filter can be designed to impart an effect on the environmental audio signal that comports with, for example, an AR experience being presented to a user at the identified location. Finally, at block 606 the selected filter can be applied to the environmental audio signal to produce an augmented audio signal.

With reference to FIG. 7, an illustrative AR environment 700 is depicted. AR environment 700 can include a number of computer-generated images (e.g., 704A, 704B and 704C), provided by a head mounted display (HMD) device 702 to augment a real-world scene, or background, surrounding user 706. The computer-generated images can be projected by HMD 702 to appear superimposed on the real-world scene and may even appear to interact with or be integral with the real-world scene. As used in this context, the real-world scene refers to a scene that user 706 would perceive without HMD device 702. The computer-generated images can be rendered based on the real-world scene captured by the HMD device 702. Understanding of the real-world scene can be based on several different techniques that provide the HMD device 702 with information of the real-world scene. For example, the real-world scene may be scanned in real-time and a mesh representation of the real-world scene, and the surrounding environment, can be dynamically generated to provide the HMD device 702 with information on the environment. For example, the recipe book icon 704C can appear superimposed and hanging in mid-air in front of cooking oven 708 or the wall in which cooking oven 708 is affixed.

In some embodiments, HMD 702 can represent the mobile computing device discussed herein (e.g., mobile computing device 102 of FIGS. 1 and 2). As such, HMD 702 can be configured to perform any of the procedures described in reference to the mobile computing device discussed herein. In other embodiments, HMD 702 can be communicatively coupled with such a mobile computing device. In such embodiments, HMD 702 could act as a display system (e.g., display system 108 of FIG. 1) for such a mobile computing device.

Figure 8:
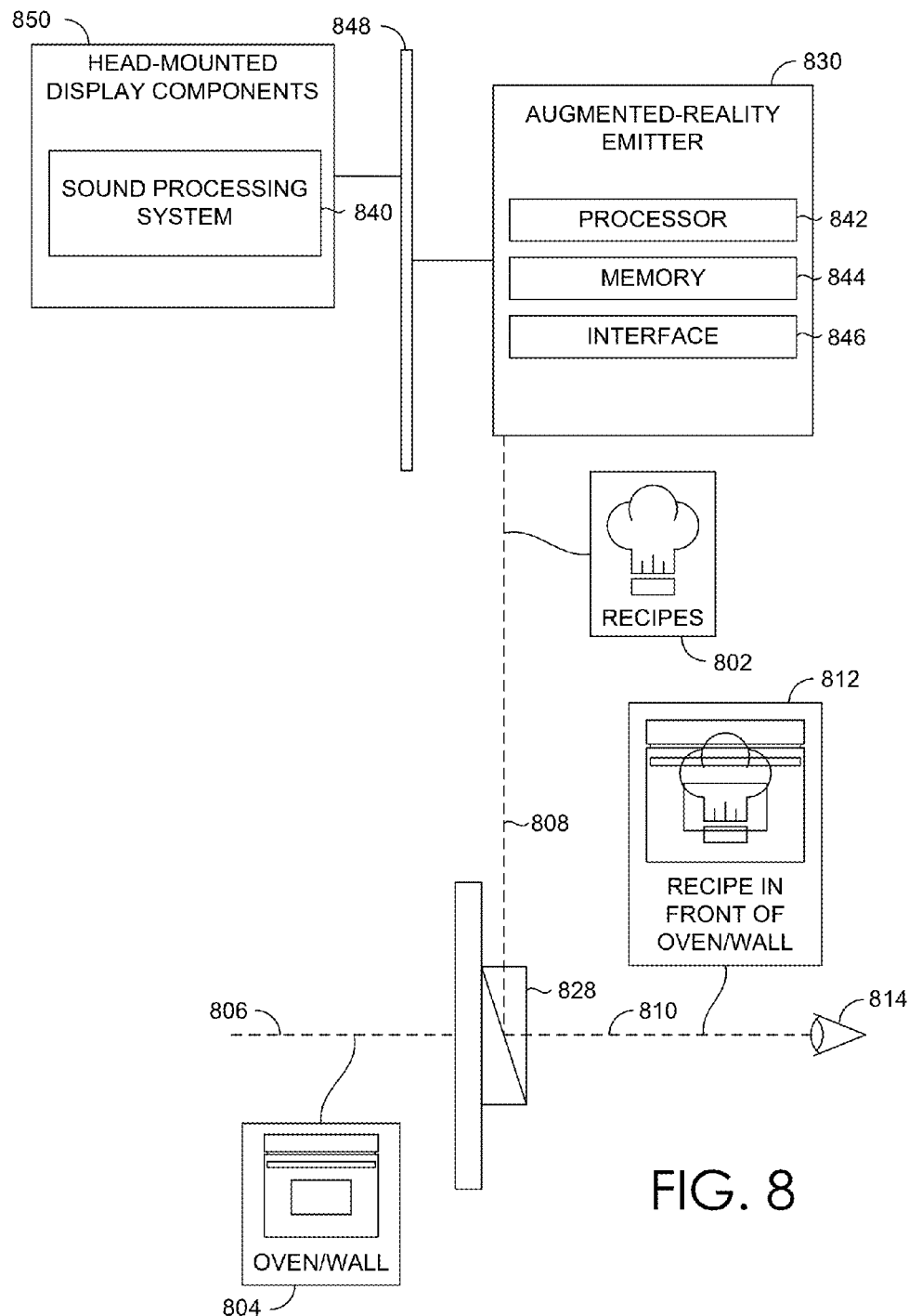
FIG. 8 is a block diagram of an exemplary head-mounted display unit, in accordance with embodiments of the present invention.
Figure 9:
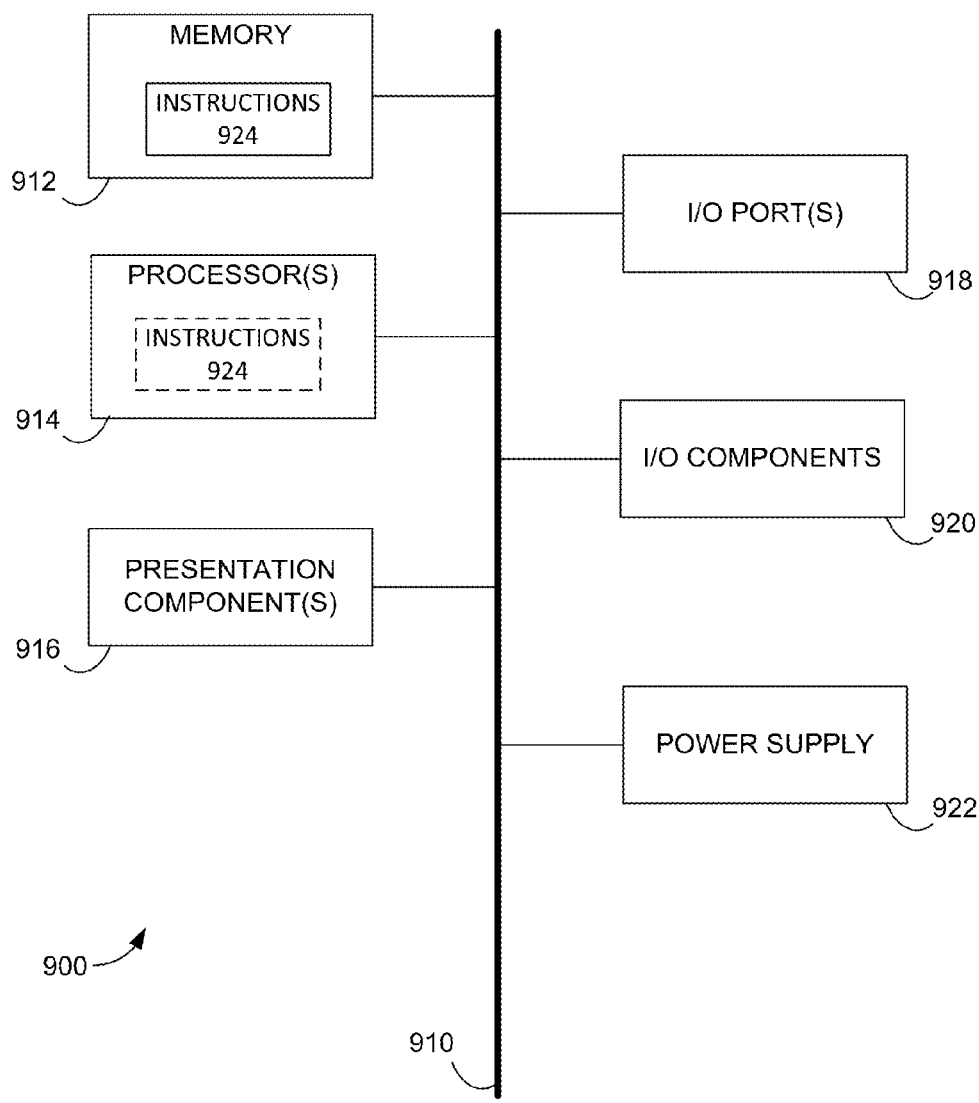
FIG. 9 is a block diagram of an illustrative computing environment suitable for use in implementing embodiments described herein.

Turning to FIG. 8, the HMD device 802 having the sound processing system 840 is described in accordance with an embodiment described herein. The HMD device 802 includes a see-through lens 810 which is placed in front of a user's eye 814, similar to an eyeglass lens. It is contemplated that a pair of see-through lenses 810 can be provided, one for each eye 814. The lens 810 includes an optical display component 828, such as a beam splitter (e.g., a half-silvered mirror). The HMD device 802 includes an augmented-reality emitter 830 that facilitates projecting and rendering the brightness of augmented-reality images. Amongst other components not shown, the HMD device also includes a processor 842, memory 844, interface 846, a bus 848, and additional HMD components 850. The augmented-reality emitter 830 emits light representing a virtual image 802 (e.g., a computer-generated image such as cave 122 of FIG. 1) exemplified by a light ray 808. Light from the real-world scene 804, such as a light ray 806, reaches the lens 810, such that the light from the real-world scene 806 is combined with the light ray 808 to produce an augmented-reality image 812. Additional optics can be used to refocus the virtual image produced by light ray 808 so that the virtual image appears to originate from several feet away from the eye 814 rather than one inch away, where the display component 828 actually is. The memory 844 can contain instructions which are executed by the processor 842 to enable the augmented-reality emitter 830 to perform functions as described herein including, but not limited to, those described in reference to sound processing system 108 of FIG. 1, 204 of FIG. 2, and process flows 600 and 700 of FIGS. 6 and 7. One or more of the processors can be considered to be control circuits. The augmented-reality emitter communicates with the additional HMD components 850 using the bus 848 and other suitable communication paths.

Light ray 808 representing virtual image 802 is reflected by the display component 828 and combined with the light from the real-world scene 806 causing an augmented-reality image 812 to be projected toward a user's eye 814, as exemplified by a light ray 810, so that the user sees the augmented-reality image 812. In the augmented-reality image 812, a portion of the real-world scene 804, such as, a cooking oven is visible along with the entire virtual image 802 such as a recipe book icon. The user can therefore see an augmented-reality image 812 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Having briefly described an overview of embodiments of the present disclosure, an illustrative operating environment in which embodiments of the present disclosure may be implemented is described below in order to provide a general context for various aspects of the present disclosure. Referring initially to FIG. 7 in particular, an illustrative operating environment for implementing embodiments of the present disclosure is shown and designated generally as computing device 700. Computing device 700 is but one example of a suitable computing environment and is not intended to suggest any limitation as to the scope of use or functionality of the disclosure. Neither should the computing device 700 be interpreted as having any dependency or requirement relating to any one or combination of components illustrated.

The disclosure may be described in the general context of computer code or machine-useable instructions, including computer-executable instructions such as program modules or engines, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of this disclosure have been described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments have been described with reference to a system for identifying sound originating from a source of interest language; the system can implement several components for performing the functionality of embodiments described herein. Components can be configured for performing novel aspects of embodiments, where "configured for" comprises "programmed to" perform particular tasks or implement particular abstract data types using code. It is contemplated that the methods and systems described herein can be performed in different types of operating environments having alternate configurations of the functional components. As such, the embodiments described herein are merely illustrative, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A mobile computing device comprising:
   one or more processors;
   a filter bank, coupled with the one or more processors, including a plurality of filters; and
   one or more computer-readable media, coupled with the one or more processors, having instructions stored thereon, which, when executed by the one or more processors, provide the mobile computing device with a sound processing system to:

receive a captured audio signal from a microphone communicatively coupled with the mobile computing device;

identify, via one or more location sensors, a physical location of the mobile computing device;

select a filter, from the filter bank, based on the identified physical location of the mobile computing device;

produce an augmented audio signal through:

application of the selected filter to the captured audio signal to produce a filtered audio signal that reflects an effect associated with an augmented reality experience object and the identified physical location, and incorporation of the filtered audio signal into the augmented audio signal; and output the augmented audio signal to enable consumption of the augmented audio signal by a user of the mobile computing device.

2. The mobile computing device of claim 1, wherein the sound processing system is further to:

select a pre-recorded audio element, from a plurality of pre-recorded audio elements, based on the identified physical location of the mobile computing device, and utilize the selected pre-recorded audio element to produce the augmented audio signal.

3. The mobile computing device of claim 2, wherein to utilize the selected pre-recorded audio element to produce the augmented audio signal includes incorporation of the selected pre-record audio element with the captured audio signal prior to application of the filter, such that the selected filter is also applied to the selected pre-recorded audio element.

4. The mobile computing device of claim 2, wherein to utilize the selected pre-recorded audio element to produce the augmented audio signal includes incorporation of the selected pre-record audio element with the augmented audio signal.

5. The mobile computing device of claim 1, wherein the microphone is a first microphone, the captured audio signal is a first captured audio signal, the selected filter is a first selected filter, the effect associated with the identified physical location is a first effect, and the sound processing system is further to:

receive a second captured audio signal captured by a second microphone communicatively coupled with the mobile computing device; and select a second filter, from the plurality of filters, based on the identified physical location of the mobile computing device and an audio source associated with the second captured audio signal, wherein to select the first filter is further based on an audio source associated with the first captured audio signal, wherein to produce the augmented audio signal further comprises:

application of the second filter to the second audio signal to produce a second filtered audio signal, and incorporation of the second filtered audio signal into the augmented audio signal.

6. The mobile computing device of claim 1, wherein the microphone is a first microphone, and the sound processing system is further to:

receive a participant audio signal the participant audio signal is captured by a participant computing device that is operated by another user, wherein the participant audio signal is captured by a second microphone communicatively coupled with the participant computing device; and utilize the participant audio signal to produce the augmented audio signal.

7. The mobile computing device of claim 6, wherein the filter is a first filter, the effect is a first effect, and the sound processing system is further to:

receive a participant location that identifies a physical location of the participant computing device;

select a second filter, from the plurality of filters, based on the participant location, wherein to produce the augmented audio signal further comprises:

application of the second filter to the participant audio signal to produce a filtered participant audio signal that reflects a second effect associated with the participant location, and incorporation of the filtered participant audio signal into the augmented audio signal.

8. The mobile computing device of claim 6, wherein the filter is a first filter, the effect is a first effect, and wherein the participant audio signal has had a second filter applied to the participant audio signal by the participant computing device to cause the participant audio signal to reflect a second effect associated with a physical location of the participant computing device.

9. A method of augmenting an audio signal comprising:

receiving, by a sound processing system, a captured audio signal produced by a microphone communicatively coupled with the sound processing system;

producing, by the sound processing system, an augmented audio signal by selectively filtering the captured audio signal based on a physical location of a computing device on which the sound processing system is operating, wherein the filtering includes applying a selected filter to the captured audio signal to produce a filtered audio signal that reflects an effect associated with an augmented reality experience object and the physical location; and outputting, by the sound processing system, the augmented audio signal to a speaker coupled with the computing device to enable consumption of the augmented audio signal by a user of the computing device.

10. The method of claim 9, wherein selectively filtering the captured audio signal comprises:

identifying, via one or more location sensors, a physical location of the computing device;

selecting, by the sound processing system, a filter, from a plurality of filters, based on the identified physical location of the computing device; and producing, by the sound processing system, the augmented audio signal by:

applying the selected filter to the captured audio signal to produce a filtered audio signal that reflects an effect associated with the identified location, and incorporating the filtered audio signal into the augmented audio signal.

11. The method of claim 10, wherein the microphone is a first microphone, the captured audio signal is a first captured audio signal, the selected filter is a first selected filter, the effect is a first effect, and the method further comprising:

receiving, by the sound processing system, a second captured audio signal captured by a second microphone communicatively coupled with the sound processing system; and selecting, by the sound processing system, a second filter, from the plurality of filters, based on the identified location of the computing device and an audio source associated with the second captured audio signal, wherein selecting the first filter is further based on an audio source associated with the first captured audio signal, wherein producing the augmented audio signal further comprises:
applying the second filter to the second audio signal to produce a second filtered audio signal, and
incorporating the second filtered audio signal into the augmented audio signal.

12. The method of claim 10, wherein the microphone is a first microphone, the method further comprising:
receiving a participant audio signal, the participant audio signal is captured by a participant computing device that is operated by another user, wherein the participant audio signal is captured by a second microphone communicatively coupled with the participant computing device; and
utilizing the participant audio signal to produce the augmented audio signal.

13. The method of claim 12, wherein the filter is a first filter, the effect is a first effect, and the method further comprising:
receiving a participant location that identifies a physical location of the participant computing device;
selecting a second filter, from the plurality of filters, based on the participant location, wherein producing the augmented audio signal further comprises:
applying the second filter to the participant audio signal to produce a filtered participant audio signal reflecting a second effect associated with the participant location, and
incorporating the filtered participant audio signal into the augmented audio signal.

14. The method of claim 12, wherein the filter is a first filter, the effect is a first effect, and wherein the participant audio signal has had a second filter applied to the participant audio signal by the participant computing device to cause the participant audio signal to reflect a second effect associated with a physical location of the participant computing device.

15. One or more computer-readable media, having instructions stored thereon, which, when executed by one or more processors of a computing device, provide the computing device with a sound processing system to:
receive a captured audio signal produced by a microphone communicatively coupled with the computing device;
identify, via one or more location sensors, a physical location of the computing device;
select a filter, from the filter bank, based on the identified physical location of the mobile computing device;
produce an augmented audio signal, through application of the selected filter to the captured audio signal, that reflects an effect associated with an augmented reality experience object and the identified physical location; and
output the augmented audio signal to enable consumption of the augmented audio signal by a user of the computing device.

16. The one or more computer-readable media of claim 15, wherein the sound processing system is further to:
select a pre-recorded audio element, from a plurality of pre-recorded audio elements, based on the identified physical location of the computing device, and utilize the selected pre-recorded audio element to produce the augmented audio signal, wherein to utilize the selected pre-recorded audio element to produce the augmented audio signal includes:
incorporation of the selected pre-record audio element with the captured audio signal prior to application of the filter, such that the selected filter is also applied to the selected pre-recorded audio element; or
incorporation of the selected pre-record audio element with the augmented audio signal.

17. The one or more computer-readable media of claim 15, wherein the microphone is a first microphone, the captured audio signal is a first captured audio signal, the selected filter is a first selected filter, the effect associated with the identified physical location is a first effect, and the sound processing system is further to:
receive a second captured audio signal captured by a second microphone communicatively coupled with the computing device; and
select a second filter, from the plurality of filters, based on the identified physical location of the computing device and an audio source associated with the second captured audio signal, wherein to select the first filter is further based on an audio source associated with the first captured audio signal, wherein to produce the augmented audio signal further comprises:
application of the second filter to the second audio signal to produce a second filtered audio signal, and
incorporation of the second filtered audio signal into the augmented audio signal.

18. The one or more computer-readable media of claim 15, wherein the microphone is a first microphone, and the sound processing system is further to:
receive a participant audio signal captured by a participant computing device that is operated by another user, the participant audio signal captured by a second microphone communicatively coupled with the participant computing device;
receive a participant location that identifies a physical location of the participant computing device;
select a second filter, from the plurality of filters, based on the participant location, wherein to produce the augmented audio signal further comprises:
application of the second filter to the participant audio signal to produce a filtered participant audio signal reflects a second effect associated with the participant location, and
incorporation of the filtered participant audio signal into the augmented audio signal.

19. The one or more computer-readable media of claim 15, wherein the effect associated with the identified physical location reflects an augmented-reality experience in which the user is immersed.

20. The one or more computer-readable media of claim 19, wherein the effect associated with the identified physical location reflects a computer-generated visual object being presented to the user at the identified location within the augmented-reality experience.

* * * * *